358-69. OR 3,204,024 SR

T 6532

Aug. 31, 1965 E. O. KEIZER 3,204,024
COLOR TELEVISION INDEXING CONTROL UTILIZING INTENSITY
AND VELOCITY MODULATION TECHNIQUES
Filed Aug. 7, 1961 3 Sheets-Sheet 1

INVENTOR.
EUGENE O. KEIZER
BY
W. H. Sprague
ATTORNEY

INVENTOR.
EUGENE O. KEIZER
BY
[signature]
ATTORNEY

INVENTOR.
EUGENE O. KEIZER
BY
W. H. Sprague
ATTORNEY

United States Patent Office 3,204,024

Patented Aug. 31, 1965

3,204,024

COLOR TELEVISION INDEXING CONTROL UTILIZING INTENSITY AND VELOCITY MODULATION TECHNIQUES

Eugene O. Keizer, Princeton, N.J., assignor to Radio Corporation of America, a corporation of Delaware Filed Aug. 7, 1961, Ser. No. 129,807
9 Claims. (Cl. 178—5.4)

This invention relates to color television image-reproducing systems and particularly to those using cathode ray image reproducing tubes having luminescent screens in the form of different color-producing phosphor strips wherein information regarding the position of an electron beam relative to the strips is sensed and the sensed information is used to control the electron beam in conjunction with color representative signals.

It has been proposed to effect color image reproduction by a cathode ray tube in which the color light-producing phosphors are arranged substantially vertically so that the strips may be excited in rapid succession by an electron beam deflected transversely of the strips in a series of vertically spaced, substantially parallel lines. Such screens are additionally provided with index strips aligned with (i.e., parallel to) the color light-producing phosphor strips so that, when impinged by the electron beam, distinctive indexing signals are derived which are generally indicative of successive positions of the beam as it is deflected over the screen. Such index strips are arranged in predetermined relation to the color phosphor strips.

One of the ways in which such indexing signals have been used is to control the modulation of the electron beam so that its intensity at any instant corresponds with the color which it is desired to produce at the same instant that the beam impinges upon a phosphor strip capable of making that color.

The indexing signals modulated by color signals also have been used to vary the rate of the horizontal deflection of the beam over the phosphor strips so that it is retarded in its traverse of those strips capable of making the particular colors represented by the color signals.

One of the advantage of controlling either electron beam intensity modulation or beam deflection rate by such indexing signals is that it is unnecessary to effect particular compensation for any non-linearity of the horizontal beam deflection, non-uniformity in the spacing and/or width of the color phosphor strips, and the like. It has been found that such systems work satisfactorily when the indexing signals are derived from index strips coinciding in position with the color phosphor strips capable of making the particular color corresponding to the signal by which the beam is controlled. Also, either one of such systems works satisfactorily when reproducing desaturated or pastel shades of colors other than that produced by the color phosphor strips with which the index strips are registered.

Some color distortion is encountered, however, when it is attempted to make highly saturated colors other than that produced by the color phosphor strips with which the index strips are in register. In such cases, the color control wave derived from the indexing signals is shifted in phase so that, when it is used to control the electron beam, either by intensity modulation or by deflection rate variation, a shift in the hue of the color produced by the cathode ray tube is effected, thereby causing a color distortion.

It is an object of the present invention to increase color saturation and at the same time to reduce color distortion in a color television image-reproducing system including a cathode ray tube having vertically oriented color phosphor strips.

In accordance with this invention, beam position indexing signals are derived from a cathode ray image-reproducing tube having vertically oriented color phosphor light-producing strips and are converted into an indexing wave. The indexing wave is modulated both in phase and in amplitude by color representative signals to produce a color control wave which is used to vary the intensity of the electron beam in accordance with the image color to be reproduced. Also, the color control wave is employed to vary the rate of horizontal beam deflection over the vertical phosphor strips in accordance with the image color to be reproduced.

Moderately saturated images may be reproduced either by beam intensity modulation alone or by beam deflection rate variation alone, but in each case some undesired phase shift of the indexing signal is produced which results in a hue error. The resultant hue error increases as a function of the image saturation. It has been discovered that hue errors produced by either beam intensity modulation alone or by beam deflection rate variation alone are of opposite senses. The combination of these two types of beam controls in accordance with this invention produces additive image saturation effects and subtractive hue error effects. In a given system utilizing a particular beam spot size, a particular index strip width and similar factors, optmium results of increased image saturation and decreased color distortion may be obtained by properly proportioning the beam controls effected respectively by intensity modulation and deflection rate variation.

The invention may be more fully understood from the following description of an illustrative embodiment shown in the accompanying drawings of which:

Figure 7:
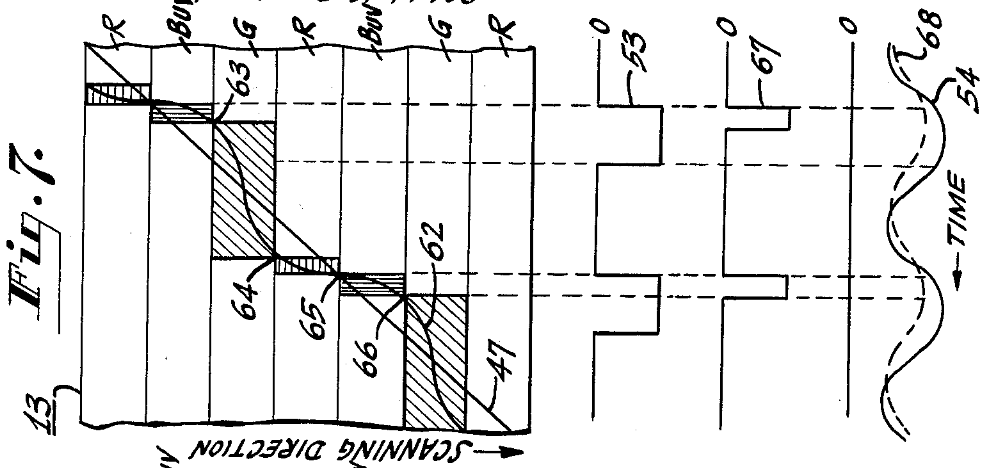
Figure 8:
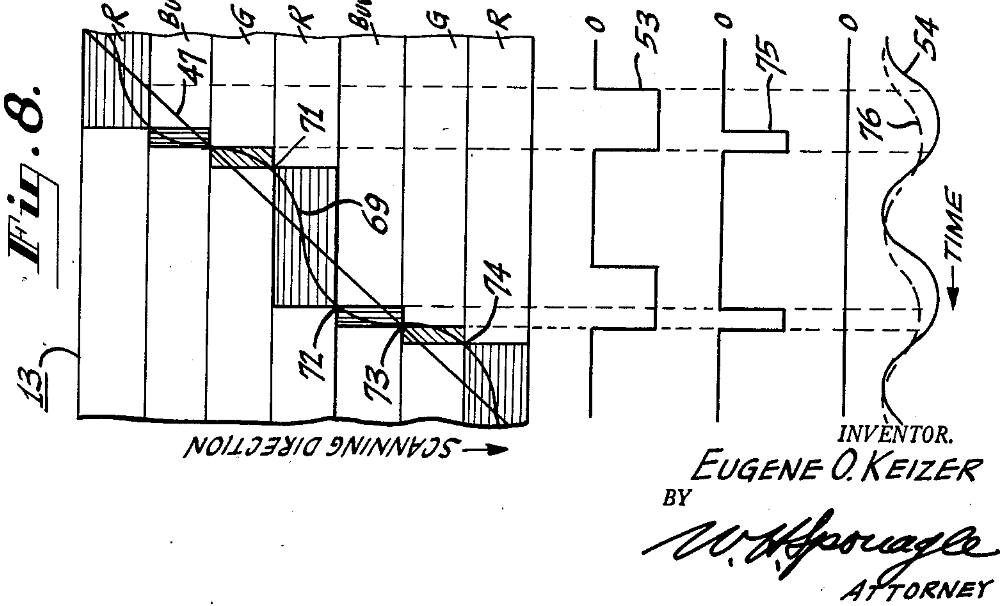

FIGURE 7 is a similar set of typical waveforms such as would be developed when the horizontal deflection rate of the electron beam is varied to produce a highly saturated color by means of the color phosphor strips which appear in the screen at the right of the indexing signal-producing strips; and FIGURE 8 is a similar set of typical waveforms such as would be developed when the horizontal deflection rate of the electron beam is varied to produce a highly saturated color by means of the color phosphor strips which appear in the screen at the left of the indexing signal-producing strips.

Figure 1:
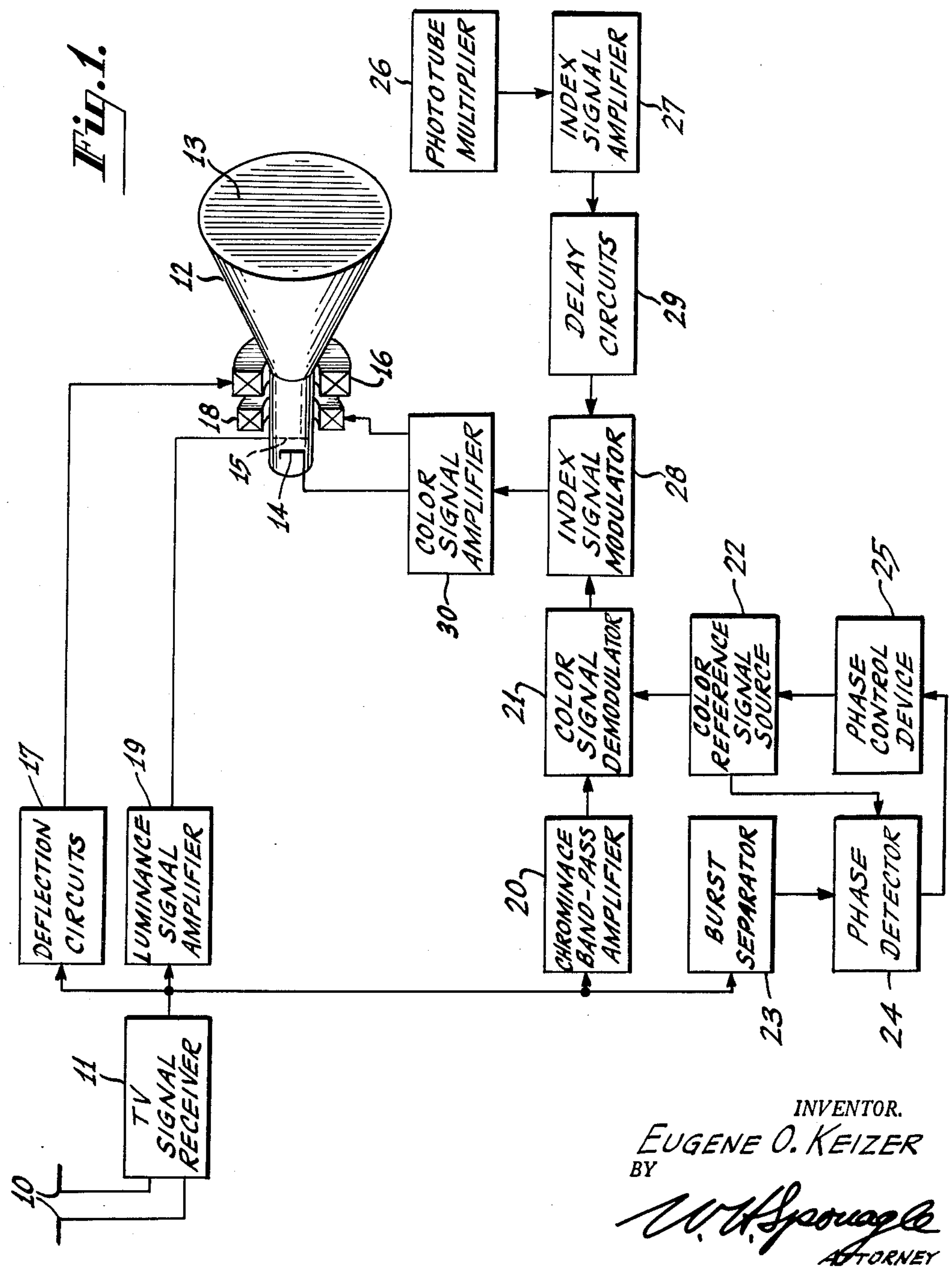
FIGURE 1 is a block diagram of a television receiver embodying the invention.

A color television receiver embodying the invention is generally illustrated in FIGURE 1. The radiated carrier wave which is modulated by a composite color television signal including a luminance signal component and a chrominance signal component is received by an antenna 10 and processed by any known television receiver 11. Such a composite television signal derived from the receiver 11 is separated by any known means into its various components for operation of a color image-reproducing device such as a cathode ray tube or kinescope 12. This tube is provided with a luminescent screen 13 composed of a multiplicity of groups of vertically oriented phosphor stripes, the respective strips of each group being capable of emitting light of different colors when excited by an electron beam. Illustrative details of such a screen will be described subsequently in connection with FIGURE 2. The kinescope 12 is also provided with a beam intensity-controlling electron gun including a cathode electrode 14 and a grid electrode 15.

The electron beam is deflected both horizontally and vertically to scan the usual rectangular raster of vertically spaced substantially parallel lines transverse to the phosphor strips by means of a first or main deflection yoke 16. The composite color television signal derived from the receiver 11 includes deflection synchronizing pulses which are applied to deflection circuits 17 for energization of the deflection yoke 16 in the usual manner. A second or auxiliary horizontal deflection coil 18 varies the rate of horizontal beam deflection when suitably energized in a manner and for a purpose to be described more fully subsequently. Preferably such a coil is mounted internally of the yoke 16.

The luminance signal component of the composite signal derived from the receiver 11 is applied to and processed in a luminance signal channel including a luminance signal amplifier 19. As shown in this particular receiver for illustration of the present invention, the luminance signal is applied to the grid 15 of the color kinescope 12. The chrominance signal component of the composite signal derived from the receiver 11 is applied to a chrominance signal channel which includes conventional apparatus for deriving color representative signals from the chrominance component. In the present U.S. standard color television signal, the chrominance signal component is a phase and amplitude modulated subcarrier wave having a nominal frequency corresponding to one of the higher video signal frequencies. In the present case, this frequency is approximately 3.58 mc. per second.

As is typical in known receivers for such a composite color television signal, the chrominance signal component is separated from the rest of the signal by means such as a chrominance signal bandpass amplifier 20. This amplifier, for example, passes signals in the range of 2 to 4 mc. Thus, the phase and amplitude modulated color subcarrier wave is impressed upon one input circuit of a color signal demodulator 21. This demodulator is of the synchronous variety and is supplied with selected phases of a reference signal wave, has the nominal frequency of the color subcarrier wave and the phases of this wave which are supplied to the color demodulator 21 depend upon the particular phase angles at which it is desired to demodulate the color subcarrier wave. As is known in the art such demodulating phases are, to a considerable degree, matters of choice and depend upon such considerations as maximum bandwidth of the signals to be produced, the possible use of matrixing circuits and, if such are used, the character and relative complexity of such circuits, and the like. Accordingly, it will be understood that, for the purpose of describing the present invention, there may be derived from the color demodulator 21 red and blue representative signals. Particularly, such signals usually are termed "color difference signals" or "color minus luminosity signals."

The received composite color television signal also includes periodic bursts of several cycles of the color subcarrier nominal frequency for use in controlling the phase of the reference signal wave produced by the source 22. Accordingly, the composite color television signal also is impressed upon a burst separator 23 which operates to produce in its output circuit only the periodic bursts of the color synchronizing signal. Such bursts are impressed upon one of two input circuits of a phase detector 24, the other input circuit having impressed thereon the reference signal wave derived from the source 22. Any phase deviation between these signals is detected and produces in the output circuit of the phase detector a signal indicative of such phase deviation which is applied to a control device 25 and, as indicated, the output of this device is connected to the reference signal source 22. In a typical instance where the source 22 is an oscillator, the control device 25 may be a reactance tube forming one of the frequency determining elements of the oscillator. Such arrangements are known and frequently used in systems of this character and hence no further description thereof is deemed necessary.

All of the apparatus of FIGURE 1 described up to this point may be of the type disclosed in "Color Television Service Data—1960 No. T5" by RCA Service Company, Camden, N.J., printed May 10, 1960.

The indexing signals, which in the illustrative embodiment of the invention are in the form of invisible (e.g. ultra violet) radiation from the luminescent screen, are sensed by a phototube multiplier 26 which may be provided, for example, with an ultra violet passing filter for response only to this type of radiation. An illustrative phototube multiplier is an RCA type 931–A. These indexing signals are impressed upon an index signal amplifier 27 from which is derived a substantially sinsuoidal indexing wave having a frequency (typically about 6 mc. per second) dependent principally upon the average beam deflection rate and the number of groups of color phosphor strips.

The output from the amplifier 27 is impressed upon one input of an indexing wave modulator 28, preferably through delay circuits 29. As disclosed in Patent 2,967,210 issued January 3, 1961, to R. D. Kell, such circuits compensate for inherent delays of the indexing wave so that the wave derived by beam deflection in one horizontal raster line is used for beam control during the next succeeding (in time) raster line. There also are impressed upon this modulator the color representative signals derived from the color demodulator 21. The index signal modulator 28 may be any known device (such as that used in the TX–1B Colorplexer manufactured by Radio Corporation of America) by which to produce a color control wave which is phase and amplitude modulated by color representative signals.

The output of the index signal modulator 28 is coupled to a color signal amplifier 30. The output of this amplifier is impressed upon the cathode 14 of the color kinescope 12 for control of the intensity of the electron beam in combination with that effected by the control grid 15 in response to the luminance signal component of the composite color television signal. The output of this amplifier also is impressed upon the auxiliary deflection coil 18 which modifies the beam deflection produced by the yoke 16 so that the beam is retarded as it traverses the phosphor strips capable of producing the color represented by the color signals and is accelerated as it traverses other phosphor strips. Each point of beam retardation is determined by the hue of the image area as represented by the phase of the color control wave applied to the coil 18. The amount of beam retardation is determined by the saturation of the image area as represented by the amplitude of the color control wave applied to the coil 18. The magnitude of the color control wave applied to the auxiliary deflection coil 18 may be the same as, less than, or greater than the magnitude of this wave applied to the cathode 14 whichever is appropriate.

Figure 2:
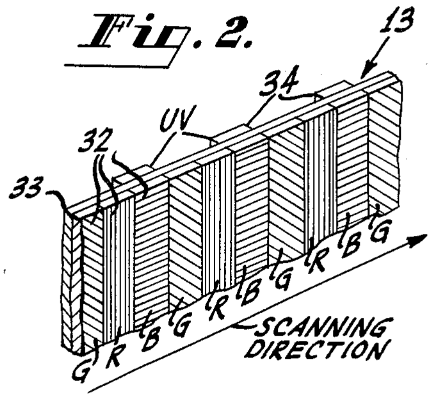
FIGURE 2 is a fragmentary illustration to an enlarged scale of a portion of the luminescent screen of a color image-reproducing cathode ray tube used in a system embodying the invention.

Before describing the manner in which an unwanted phase deviation of the indexing signal wave is caused and the compensation of it provided by the instant invention, reference next will be made to FIGURE 2 for a more detailed description of the luminescent screen 13 of FIGURE 1. As previously indicated, the screen is composed of a multiplicity of groups of three different color light-producing phosphor strips such as the strips 32. In the present example it is seen that the order of the strips in the indicated direction in which the beam scans over them is red, blue, green as indicated by the letters R, B, G, R, B, G, etc. These strips may be covered on the side toward the electron gun by a backing 33 such as a layer of aluminum which is sufficiently thin to be pervious to the electron beam. On the back side of this film there are provided ultra violet (UV) radiation-producing index strips 34 which as indicated are aligned with (i.e., parallel to) all of the phosphor strips and are in registry with the blue light-producing phosphor strips B. It is to be understood that the index strips 34 may be registered with any other color light-producing phosphor strips or any combination thereof. Also, as is known in the art, the UV phosphor material may be mixed with any of the color light-producing phosphor material so that separate index strips are not necessary. In any case, wherever the electron beam is directed to a color strip with which an index strip is registered, not only is the appropriate color light produced, but also a pulse of ultra violet radiation is produced. The magnitude, or energy content, of the ultra violet pulse depends upon the intensity of the electron beam and the length of time it impinges upon the index strip.

For an explanation of the manner in which the indexing signal wave derived from the UV indexing pulses is undesirably shifted in phase when the intensity of the electron beam is modulated in making highly saturated colors other than that produced by the color phosphor strips with which the indexing strips are registered will now be given with reference to the waveforms of FIGURES 3, 4 and 5. In order not to unduly complicate this explanation, it will be given with reference to a system in which the color strips of the color kinescope are of equal widths and are uniformly spaced relative to one another. In such a case, the electron beam is modulated in intensity symmetrically as the beam traverses the strips. In other words, the blue phosphor strips are excited, for example, at the 0° phase angle of the color cycle, the green phosphor strips are excited at a 120° phase angle and the red phosphor strips at a 240° phase angle. Also, the color control wave by which the beam intensity is modulated is of a substantially sinusoidal character at the frequency of the color cycle. It will be understood by those skilled in the art, however, that other color phosphor and index strip widths and arrangements may be employed, other phase angles of the color control wave may be utilized, and waveforms other than a sinusoidal one may be utilized. Also, for the purpose of this explanation, the color representative signals derived from the color demodulator 21 of FIGURE 1 and impressed upon the index signal modulator 28 are red and blue color difference signal $R-Y$ and $B-Y$ respectively, where Y represents the luminance signal component of the received composite television signal. Again, it will be understood by those skilled in the art that other color difference signals may be employed in practicing this invention. All such alternatives are known in the art and form no part of the instant invention which is capable of operation in systems using any of these known techniques.

Figure 3:
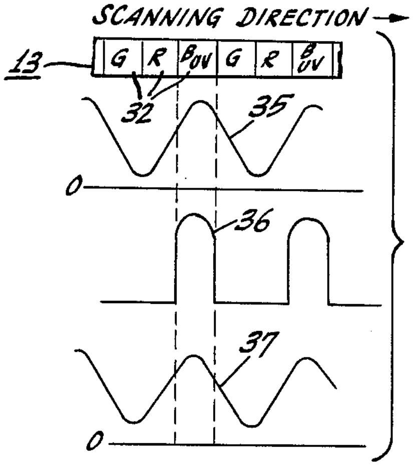
FIGURE 3 is a series of waveforms, shown in relation to the color phosphor and indexing strips of the cathode ray tube screen, such as would exist when the intensity of the electron beam is modulated to produce a highly saturated color by means of the color phosphor strips in registry with the indexing signal-producing strips.

Reference first will be made to FIGURE 3. With the UV index strips 34 registered with every blue (B) one of the color phosphor strips 32 as indicated in FIGURE 2, the color control wave 35 indicates the intensity modulation of the electron beam with reference to the color and index strips of the screen 13 as the beam scans the screen from left to right as indicated in FIGURE 3. The waveforms are representative of the results obtained when it is desired to make a highly saturated blue portion of the image on the screen 13. It is seen that the color control wave 35 has maximum intensity when it is centered over the blue and index strips of the screen. As a consequence, the indexing signals developed while the beam impinges upon the blue and index strips are represented by the symmetrically shaped indexing signal pulses 36. These pulses are converted in a known manner by means such as a low pass filter (not shown) having an upper cutoff frequency of less than the second harmonic of the nominal repetition rate of the pulses 36 into a substantially sinusoidal indexing signal wave 37. The conversion of the pulses 36 to an indexing signal wave 37 may be effected either in the index signal modulator 28 of FIGURE 1 or in suitable apparatus feeding the indexing signal input to the modulator. It is seen that the indexing signal wave 37 is in substantially exact phase with the color control wave 35 representing the beam intensity modulation. The index signal modulator 28 modulates the indexing signal wave 37 with the color representative signals derived from the color demodulator 21 and thus converts it into the color control wave 35 by which to modulate the electron beam intensity suitably to make the desired saturated blue portion of the reproduced image.

Figure 4:
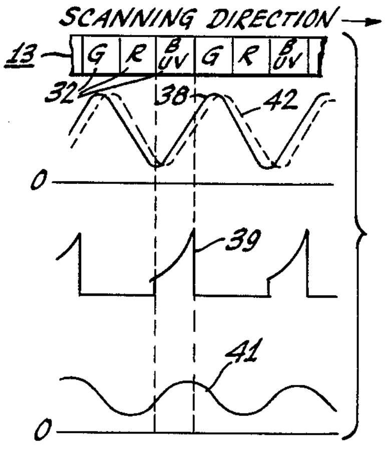
FIGURE 4 is a similar set of typical waveforms such as would be developed when the intensity of the electron beam is modulated to produce a highly saturated color by means of the color phosphor strips which appear in the screen at the right of the indexing signal-producing strips.

When it is attempted to make a highly saturated green portion of the reproduced image by beam intensity modulation alone, the manner in which the undesired color distortion occurs is illustrated by the waveforms of FIGURE 4. The curve 38 represents the desired color control wave for producing saturated green. This curve also indicates the intensity modulation of the electron beam with reference to the color and index strips of the screen 13 as the beam scans it from left to right as indicated in this figure. It is seen that the color control wave 38 representing the electron beam intensity has substantially its minimum amplitude as the beam impinges the left hand portions of the blue and index strips of the screen. This beam intensity increases somewhat as the beam traverses the blue and index strips causing the generation of indexing pulses 39 shaped somewhat as illustrated with the major portion of the energy content of the pulses occurring to the right of center of each of the indexing strips.

When such pulses are converted into the substantially sinusoidal indexing signal wave 41 it is seen that this wave is shifted in phase in the direction in which the screen is scanned by the electron beam. In other words, it is undesirably retarded in phase. Also, by virtue of the fact that the indexing pulses 39 have approximately only one-half of the energy of the pulses 36 of FIGURE 3, the amplitude of the indexing signal wave 41 is less than that of the indexing signal wave 37 of FIGURE 3. The amplitude difference of the indexing signal waves has substantially no significance so far as the problem of color distortion in such a system is concerned. The real problem arises from the phase shift on the indexing signal wave 41 relative to the color and index strips of the kinescope screen. Were the indexing signal wave 41 to be applied to the index signal modulator 28 of FIGURE 1 for modulation by the color representative signals, a color control wave 42 would be produced. In conformance with the assumed symmetrical beam intensity modulation, the indexing signal wave 41 would be shifted in phase by 120° by the modulator 28 to form the color control wave 42. It is seen that such a color control wave has its maximum amplitude, not as desired at the time that the electron beam is centered over the green phosphor strips of the screen, but instead when the electron beam is impinging partly on both the red and green phosphor strips. In such a case, instead of producing a saturated green portion of the color image a somewhat reddish green hue would be produced. This, of course, is an undesired color distortion.

Figure 5:
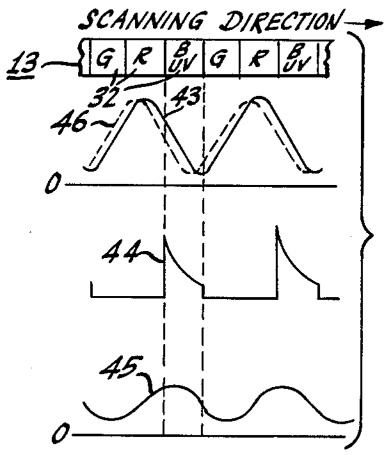
FIGURE 5 is a similar set of typical waveforms such as would be developed when the intensity of the electron beam is modulated to produce a highly saturated color by mean of the color phosphor strips which appear in the screen at the left of the indexing signal-producing strips.

FIGURE 5 illustrates the kind of unwanted color distortion which is experienced when an attempt is made to reproduce a highly saturated red portion of the color image by beam intensity modulation alone. The curve 43 represents the desired color control wave for producing saturated red. As in the case of the blue and green examples previously described, this curve also indicates the beam intensity modulation with reference to the color and index strips of the screen 13 as the beam traverses the screen from left to right as indicated. In this case, the color control wave 43 has its maximum amplitude and, hence the beam has its maximum intensity, substantially at the centers of the red strips. As the color control wave 43 indicates, the beam intensity is considerably less than maximum as the beam impinges upon the left hand portions of the blue and index strips and this intensity decreases still further to substantially a minimum while the beam is traversing the remaining portions of the index strips. As a consequence of such beam excitation of the index strips, indexing pulses 44 are generated and have approximately the shapes indicated in this figure.

The conversion of these pulses into the substantially sinusoidal indexing signal wave 45 results in this wave having its phase shifted oppositely to the direction in which the screen is scanned by the electron beam. In other words, it is undesirably advanced in phase. Again as in the saturated green example illustrated in FIGURE 4, the wave 45 has a somewhat reduced amplitude by virtue of the reduced energy content of the indexing pulses 44. If such a wave were applied to the index signal modulator 28 of FIGURE 1 for modulation by green representative signals it would, in accordance with the assumed conditions, be shifted in phase by 240° so as to produce a color control wave 46. It is seen that the electron beam intensity as represented by this wave is not at its maximum as the beam impinges the centers of the red strips. Instead, the maximum beam intensity occurs while the electron beam is impinging partly on both the red and green phosphor strips. In such a case, the reproduced color would be greenish red instead of a pure saturated red as desired.

Figure 6:
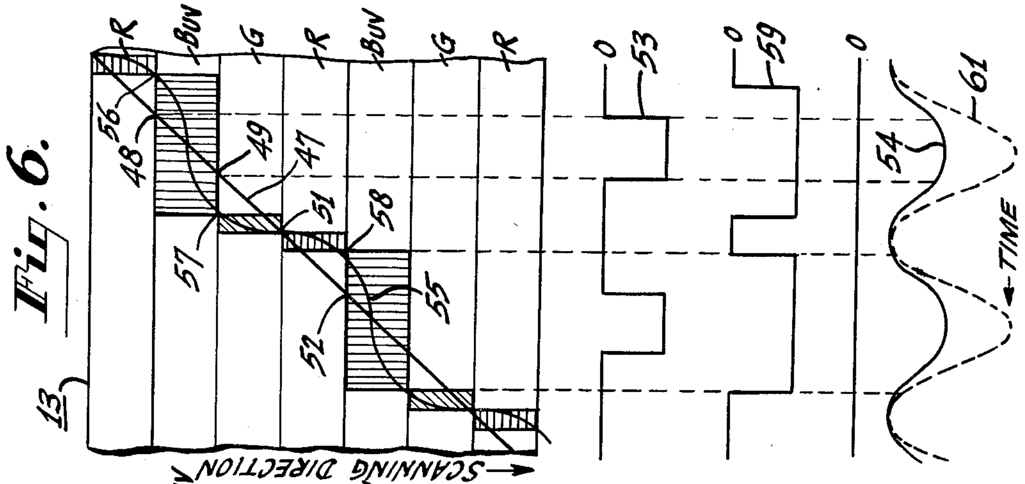
FIGURE 6 is another series of waveforms, shown in relation to the color phosphor and index strips of the cathode ray tube screen, such as would exist when the horizontal deflection rate of the electron beam is varied to produce a highly saturated color by means of the color phosphor strips in registry with the indexing signal-producing strips.

For an explanation of the manner in which the indexing signal wave derived from the UV indexing pulses is undesirably shifted in phase when the horizontal deflection rate of the electron beam is varied in making highly saturated colors other than that produced by the color phosphor strips with which the index strips are registered, reference now is made to the waveforms of FIGURES 6, 7 and 8. In the system used as an illustrative example for this explanation, the color phosphor strips of the color kinescope are of equal widths with uniform spacing relative to one another and the index strips are registered with the blue phosphor strips. The blue phosphor strips are excited at the 0° phase angle of the color cycle, the green phosphor strips are excited at a 120° phase angle and the red phosphor strips at a 240° phase angle. The normally uniform horizontal deflection rate of the electron beam is varied according to a sinusoidal function at the frequency of the color cycle. It will be understood by those skilled in the art, however, that other color phosphor and index strip arrangements may be employed, other phase angles of the sinusoidal wave by which the horizontal deflection of the electron beam is varied may be chosen, and waveforms other than a sinusoidal one may be utilized for varying the rate of horizontal deflection of the electron beam. The color representative signals derived from the color signal demodulator 21 of FIGURE 1 and impressed upon the index signal modulator 28 are red and blue color difference signals *R—Y* and *B—Y*, where Y represents the luminance signal component of the received composite television signal. Again, it will be understood by those skilled in the art that other color difference signals may be employed in practicing this aspect of the invention.

Reference first is made to FIGURE 6. When the electron beam is deflected at a constant horizontal rate, it makes a linear trace 47 over the strips of the luminescent screen 13. The beam, therefore, impinges upon each of the phosphor strips in succession for equal periods of times. For example, the trace 47 traverses the blue and UV index strips between points 48 and 49. Traversal of a green strip is between points 49 and 51 and traversal of a red strip is between points 51 and 52. Considering time to be running in the direction from top to bottom of the figure, the time periods represented by points 48–49, 49–51, and 51–52 are equal. If it is assumed that equal portions of blue, green and red light combine additively to make white light, such a linear beam 47 is effective to produce an uncolored portion of the image.

The electron beam, following the linear beam trace 47 in crossing the blue and index signal strips between points 48 and 49 produces an indexing signal wave 53. Such a wave is then converted by the apparatus of FIGURE 1 into substantially sinusoidal color control wave 54 for use in controlling the operation of the color kinescope 12.

If now the rate of horizontal beam deflection is varied in a sinusoidal manner at the indexing frequency in proper phase and amplitude to make a highly saturated blue portion of the image, the electron beam follows the substantially sinusoidal trace 55 shown in FIGURE 6. The sinusoidal beam trace 55 no longer traverses the different color phosphor strips in equal time periods, but instead dwells longer on the blue strips than upon the green and red strips. For example, traversal of a blue and index strip is between points 56 and 57, traversal of a green strip is between points 57 and 51 and traversal of a red strip is between points 51 and 58. Again considering that time runs downward in this figure, it is seen that the electron beam is caused to dwell upon the blue strips for a considerably longer time and it impinges upon the green and red strips. As a consequence, a highly saturated blue portion of the image is produced. The shading of the strip areas indicates that the amount of light produced by the respective strips is a function of the length of time that the beam impinges upon the strips. It is seen that a substantial amount of blue light and very little green and red light is produced.

By reason of the fact that the beam dwells longer upon the blue and index strips than in the previous example of a white or colorless area, an indexing signal wave 59 is produced. This indexing wave is in phase with the indexing wave 53, the only difference being that the pulses are of different width by virtue of the different periods of time that the beam takes in crossing the index strips. As a consequence, the sinusoidal color control wave 61 which is produced by the apparatus of FIGURE 1 from the indexing wave 59 is in phase with the previously described color control wave 54, the two waves differing from one another only in peak-to-peak amplitude which for present considerations has no significance.

FIGURE 7 illustrates the operation of a color kinescope when it is attempted to make a highly saturated green portion of the image by means of varying the horizontal beam deflection rate. As in the description of FIGURE 6, the operation will be described with reference to a linear beam trace 47. As in FIGURE 6 a linear beam trace produces an indexing signal wave 53 which is productive of a color control wave 54. These waveforms are repeated so as to provide a reference. In order to make a highly saturated green portion of the image, the horizontal beam deflection rate is varied under the control of the sinusoidal color control wave which is the same as that used for the production of a highly saturated blue image area except that it is shifted approximately 120° in phase. Such a sampling wave then causes the beam to make a sinusoidal trace 62 which is shifted in phase along the linear trace 47 so that the beam dwells longer on the green strips than on the red and blue strips. For example, traversal of a green strip is between points 63 and 64, traversal of a red strip is between points 64 and 65 and traversal of a blue strip is beween points 65 and 66.

An indexing signal wave 67 results from the traversal of the blue and UV index strips of the screen by the sinusoidal beam trace 62. The beam enters the index strips at the same point in time that it would enter following the linear trace 47. The beam, however, leaves the index strips considerably earlier than it would when following the linear trace 47. The pulses of the wave 67, as a consequence, not only are narrower than the pulses of the wave 53, but also are advanced in phase relative to the pulses of the wave 53. The color control wave 68 which is made by the conversion of the indexing signal wave 67 also is advanced in phase relative to the indexing signal wave 54. The use of color control wave 68, in controlling the variation of the horizontal beam deflection rate, produces a somewhat bluish green hue instead of the desired pure green hue. This is an undesired color distortion. The point to be noted is that it is a distortion of a saturated green portion of the image which is in a sense opposite to the distortion produced when intensity modulation of the electron beam alone is used as described with reference to FIGURE 4.

A saturated red portion of the image, when attempted by horizontal beam deflection rate variation alone, is depicted in FIGURE 8. Again the linear trace 47, the resulting indexing signal wave 53 and the color control wave 54 are shown for reference purposes. The sinusoidal color control wave by which the horizontal beam deflection rate is varied is essentially the same as that used for the production of a highly saturated blue portion of the image except that it is shifted in phase by 240°. This results in the production of a sinusoidal beam trace 69, the phase of which with reference to the phosphor and index strips being such that the beam is caused to dwell on the red phosphor strips for considerably longer periods of time than it dwells upon the blue and green strips. For example, the beam traverses a red strip between points 71 and 72, the blue and UV index strips between points 72 and 73, and the green strips between points 73 and 74. An indexing signal wave 75 is developed by the beam following the sinusoidal trace 69 and is generally similar to the indexing signal wave 67 of FIGURE 7 except that it is retarded in phase relative to the indexing signal wave 53 which would be generated by the beam following the linear trace 47. The resulting sinusoidal color control wave 76 produced by the apparatus of FIGURE 1 in processing the indexing signal wave 75 is retarded in phase relative to the indexing signal wave 54.

The use of the color control wave 76 in controlling the variation of the horizontal beam deflection rate produces a color distortion such that, instead of making a pure red portion of the image, this portion has a bluish red hue. Again with reference to the color distortion produced by intensity modulation of the beam alone as described with reference to FIGURE 5, it is seen that the distortion produced by horizontal deflection rate variation alone is of an opposite sense.

The present invention utilizes the opposite kinds of color distortions produced respectively by intensity modulation of the beam alone and by horizontal deflection rate variation alone. The color control wave derived from the color signal amplifier 30 of FIGURE 1 which is modulated in phase and amplitude by the color representative signals is applied to the color kinescope 12 so as to vary both the intensity of the beam and the rate of horizontal beam deflection. As previously described, the impression of such a signal upon the cathode 14 of the color kinescope varies the beam intensity in accordance with the color representative signals. Also, the impression of such a sampling wave upon the auxiliary deflection coil 18 varies the rate of horizontal beam deflection in accordance with the color representative signals. Although each type of electron beam control produces some color distortion, particularly when making highly saturated portions of the image, the two distortions being of opposite senses tend to cancel or compensate for one another. The result is the production of more highly saturated portions of an image which have considerably less color distortion than when either of the two beam controls is used alone.

As examples of a system in which the present invention may be used to produce improved results is one in which the color kinescope screen has substantially equal width color phosphor and index strips and an electron beam which, at the screen, has a substantially circular cross section of diameter approximately equal to the width of one of the screen strips and a cosine squared distribution such as commonly employed in cathode ray tubes. Image brightness is determined by luminance signal control of the electron beam intensity. The horizontal beam deflection is varied sinusoidally by the phase and amplitude modulated color control wave having the indexing signal frequency and at such value as to substantially arrest the beam momentarily on the selected phosphor strips when maximum image saturation is desired. Also, for maximum image saturation, the beam intensity color modulation is approximately 30% of the beam intensity determined by the luminance signal.

This invention is not limited, however, to any particular system having parameters such as those given herein as an example. For instance, in a system having a luminescent screen in which the index strips are narrower than the color phosphor strips, beam intensity color modulation of more than 30% (e.g. 50%) may be employed. In such case, beam deflection variation would be less than that required to substantially arrest the beam.

What is claimed is:

1. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which an indexing wave may be derived, and in which an electron beam is deflected horizontally in a series of vertically spaced substantially parallel lines transverse to said phosphor and index strips, a system for controlling said electron beam comprising: means for horizontally deflecting said beam transversely of said phosphor and index strips normally at a substantially uniform rate; means for varying the intensity of said beam; means for modulating said indexing wave in phase and amplitude by color representative signals to produce a color control wave; means for impressing a first given amplitude of said color control wave upon said beam intensity varying means to vary said beam intensity, thereby tending to produce a phase shift of said indexing wave in a first sense; and means for impressing a second given amplitude of said color control wave upon said deflecting means to vary the horizontal beam deflection rate, thereby tending to produce a phase shift of said indexing wave in a second sense opposite to said first sense, said first and second given amplitudes of said color control wave being so related that substantially no resultant phase shift of said indexing wave is produced.

2. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which a substantially sinusoidal indexing wave may be derived, and in which an electron beam is deflected horizontally in a series of vertically spaced substantially parallel lines transverse to said phosphor and index strips, a system for controlling said electron beam comprising: means for horizontally deflecting said beam transversely of said phosphor and index strips normally at a substantially uniform rate; means for modulating said indexing wave in phase and amplitude by color representative signals to produce a substantially sinusoidal color control wave; means responsive to a luminance representative signal to effect a first variation of beam intensity; means responsive to said color control wave to effect a second variation of beam intensity and means for impressing said color control wave upon said deflecting means to vary the horizontal deflection rate of said beam in accordance with the image color to be reproduced, the amount of said second beam intensity variation and the amount of said horizontal deflection rate variation being so related to one another that substantially no resultant phase shift of said indexing wave is produced.

3. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which a substantially sinusoidal indexing wave may be derived, and in which an electron beam is deflected horizontally in a series of vertically spaced substantially parallel lines transverse to said phosphor and index strips, a system for controlling said electron beam comprising: means for horizontally deflecting said beam transversely of said phosphor and index strips normally at a substantially uniform rate; means including an electrode system within said cathode ray tube for varying the intensity of said beam; means for modulating said indexing wave in phase and amplitude by color representative signals to produce a substantially sinusoidal color control wave; and means for impressing said color control wave upon said electrode system and upon said deflecting means, respectively, in such amplitudes as to vary the intensity of said beam and to vary the horizontal deflection rate of said beam in accordance with the image color to be reproduced in suitable proportions to produce an indexing wave having substantially no phase shift.

4. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which a substantially sinusoidal indexing wave may be derived, and in which an electron beam is deflected horizontally in a series of vertically spaced substantially parallel lines transverse to said phosphor and index strips, a system for controlling said electron beam comprising: means for horizontally deflecting said beam transversely of said phosphor and index strips normally at a substantially uniform rate; means including an electrode system within said cathode ray tube for varying the intensity of said beam; means for modulating said indexing wave in phase and amplitude by color representative signals to produce a substantially sinusoidal color control wave; means for impressing a luminance representative signal upon said electrode system to effect a first variation of beam intensity; and means for impressing said color control wave upon said electrode system and upon said deflecting means, respectively, in such different amplitudes as to effect a second variation of beam intensity and to vary the horizontal deflection rate of said beam in accordance with the image color to be reproduced in suitable relative magnitudes to produce an indexing wave having substantially no phase shift.

5. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which an indexing wave may be derived, and in which an electron beam is deflected horizontally in a series of vertically spaced substantially parallel lines transverse to said phosphor and index strips, a system for controlling said electron beam comprising: means for horizontally deflecting said beam transversely of said phosphor and index strips normally at a substantially uniform rate; means including an electron system within said cathode ray tube for controlling the intensity of said beam; means responsive to color signals representative of image hue and saturation for modulating said indexing wave to produce a color control wave having phase and amplitude varying in accordance with said image hue and saturation respectively; means for impressing a luminance representative signal upon said electrode system to produce a beam intensity corresponding to image brightness; means for impressing said color control wave upon said electrode system at such a value that the maximum-to-minimum amplitude range of said color control wave effects a variation of said beam intensity by substantially 30% of the beam intensity produced by said luminance signal, thereby tending to produce a phase shift of said indexing wave in a first sense; and means for impressing said color control wave upon said deflecting means at such a value that maximum amplitude of said color control wave so varies the horizontal beam deflection rate that said beam is substantially arrested momentarily on phosphor strips determined by the phase of said color control wave, thereby tending to produce a phase shift of said indexing wave in a second sense opposite to said first sense such that substantially no undesired phase shift is produced in the resultant indexing wave.

6. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which a substantially sinusoidal indexing wave may be derived, and in which an electron beam is deflected horizontally in a series of vertically spaced substantially parallel lines transverse to said phosphor and index strips, a system for controlling said electron beam comprising: means for horizontally deflecting said beam transversely of said phosphor and index strips normally at a substantially uniform rate; means including first and second electrodes within said cathode ray tube cooperating to vary the intensity of said beam; means for modulating said indexing wave in phase and amplitude by color representative signals to produce a substantially sinusoidal color control wave; means for impressing a luminance representative signal upon said first electrode to effect a first variation of beam intensity; and means for impressing said color control wave upon said second electrode and upon said deflecting means, respectively, in such amplitude as to effect a second variation of beam intensity and to vary the horizontal deflection rate of said beam in accordance with the image color to be reproduced in suitable relative magnitudes to produce an indexing wave having substantially no phase shift.

7. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which a substantially sinusoidal indexing wave may be derived, and in which an electron beam is deflected horizontally in a series of vertically spaced substantially parallel lines transverse to said phosphor and index strips, a system for controlling said electron beam comprising: primary deflection means to horizontally deflect said beam transversely of said phosphor and index strips at a substantially uniform rate; secondary deflection means energizable to alternately aid and oppose said primary deflection means; means including first and second electrodes within said cathode ray tube cooperating to vary the intensity of said beam; means for modulating said indexing wave in phase and amplitude by color representative signals to produce a substantially sinusoidal color control wave; means for impressing a luminance representative signal upon said first electrode to effect a first variation of beam intensity; and means for impressing said color control wave upon said second electrode and upon said secondary deflection means, respectively, in such amplitude as to effect a second variation of beam intensity and to vary the horizontal deflection rate of said beam in accordance with the image color to be reproduced suitably to produce an indexing wave having substantially no phase shift.

8. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which a substantially sinusoidal indexing wave may be derived, and in which an electron beam is deflected horizontally in a series of vertically spaced substantially parallel lines transverse to said phosphor and index strips, a system for controlling said electron beam comprising: primary deflection means energizable to horizontally deflect said beam transversely of said phosphor and index strips; means for energizing said primary deflection means by a substantially sawtooth wave so as to deflect said beam at a substantially uniform rate; secondary deflection means energizable to alternately aid and oppose said primary deflection means; means including first and second electrodes within said cathode ray tube cooperating to vary the intensity of said beam; means for modulating said indexing wave in phase and amplitude by color representative signals to produce a substantially sinusoidal color control wave; means for impressing a luminance representative signal upon said first electrode to effect a first variation of beam intensity; and means for impressing said color control wave upon said second electrode and upon said secondary deflection means, respectively, in such different amplitudes as to effect a second variation of beam intensity and to vary the horizontal deflection rate of said beam in accordance with the image color to be reproduced, said different amplitudes being so related to one another that the produced indexing wave has substantially no phase shift.

9. In a color television image-reproducing system including a cathode ray tube having a luminescent screen comprising a plurality of vertically oriented phosphor strips capable of emitting light of different colors when impinged by an electron beam, and a plurality of index strips aligned with said phosphor strips and capable of producing signals when impinged by an electron beam from which an indexing wave may be derived, and in which an electron beam is deflected horizontally in a series of vertically spaced substantially parallel lines transverse to said phosphor and index strips, a system for controlling said electron beam comprising: means for horizontally deflecting said beam transversely of said phosphor and index strips normally at a substantially uniform rate; means including an electrode system within said cathode ray tube for controlling the intensity of said beam; means responsive to color signals representative of image hue and saturation for modulating said indexing wave to produce a color control wave having phase and amplitude varying in accordance with said image hue and saturation respectively; means for impressing a luminance representative signal upon said electrode system to produce a beam intensity corresponding to image brightness; means for impressing said color control wave upon said electrode system at such a value that the maximum-to-minimum amplitude range of said color control wave effects a variation of said beam intensity by substantially 50% of the beam intensity produced by said luminance signal, thereby tending to produce a phase shift of said indexing wave in a first sense; and means for impressing said color control wave upon said deflecting means at such a value that maximum amplitude of said color control wave so varies the horizontal beam deflection rate that said beam is retarded but not substantially arrested in traversing phosphor strips determined by the phase of said color control wave, thereby tending to produce a phase shift of said indexing wave in a second sense opposite to said first sense such that substantially no undesired phase shift is produced in the resultant indexing wave.

References Cited by the Examiner

UNITED STATES PATENTS

| | | | |
|---|---|---|---|
| 2,905,752 | 9/59 | Loughlin | 178—5.4 |
| 2,962,546 | 11/60 | Thompson | 178—5.4 |

DAVID G. REDINBAUGH, *Primary Examiner.*

ROBERT SEGAL, *Examiner.*